Patented Oct. 13, 1942

2,298,707

UNITED STATES PATENT OFFICE 2,298,707

PROCESS FOR REMOVING DISSOLVED SILICA FROM WATER

Otto Liebknecht, Potsdam-Babelsberg, Germany, assignor to The Permutit Company, New York, N. Y., a corporation of Delaware No Drawing. Application June 11, 1940, Serial No. 339,891. In Germany August 16, 1938

13 Claims. (Cl. 210—23)

This invention relates to a process for removing dissolved silica from water; and it comprises bringing the silica containing water in contact with granular burned magnesite, regenerating the magnesite with a dilute acid after exhaustion of its silica removal capacity, and using the acid-treated burned magnesite again for the removal of silica from additional quantities of water; all as more fully described hereinafter and as claimed.

One object of my invention is to provide a process which removes substantially all of the silica from the water.

Another object of my invention is to provide a cyclic process which permits regeneration and renewed use of the treatment medium without impairment of its silica removal capacity.

In the art of water conditioning, especially in the treatment of water for use as boiler feed water and similar purposes, the desirability of lowering the silica content has been recognized for a long time. It is well known that silica in the feed water leads to the formation of boiler scale which causes poor heat transmission. To avoid the formation of such scale it is either necessary to maintain so high an alkalinity in the boiler water that silica precipitation cannot take place, or to remove the silica from the feed water completely or at least reduce it to a practically negligible quantity. Prevention of silica scale by maintaining a high alkalinity has the disadvantage of promoting caustic embrittlement with consequent weakening of the boiler metal, and the silica is readily carried over in the steam and then is responsible for the formation of troublesome deposits on the blades of steam turbines. In using water for purposes other than boiler feed, such as textile processes generally, and dyeing specifically, the silica content likewise causes difficulties.

Various methods have been suggested for removing silica from water. One such method comprises contacting the water with insoluble gels of oxides of metals, such as aluminum and iron, and removing the silica from these gels by regeneration in order to make them suitable for further use. Another suggestion along these lines contemplates the formation of gels or gel mixtures in situ by adding to the water substances required for the formation of such gels, viz. a metal salt and an alkali, such as ammonia, or by feeding chemicals, such as the insoluble oxides and hydroxides of magnesium, zinc, cadmium, copper, manganese or the like, which upon contact with the water form the desired gels.

None of these suggestions has been wholly satisfactory in practice. Either the silica content is not reduced to a sufficiently low value, or the gels cannot be regenerated completely, it being impossible to remove all silica from the gels so that their capacity for efficient silica removal is impaired.

I have discovered that burned magnesite may be used in a cyclic process for silica removal. Such magnesite has the property of removing silica from water with which it is brought in contact, preferably by allowing the water to percolate through a bed of this material in granular form. When the capacity of the burned magnesite to take up silica has been exhausted it may be subjected to a regeneration treatment with an acid which restores its capacity for absorption of silica and thus renders the magnesite suitable for further use in removing silica from water.

The term "burned magnesite" is used to denote a sintered magnesite which has been heated to a temperature sufficiently high (about 3200° F.) to substantially reduce its solubility in dilute strong acids, such as hydrochloric acid; it is also used to denote a magnesite which has been burned at lower temperatures, as those used in the preparation of caustic magnesite (upwards of 1150° F.). Magnesite burned at such lower temperatures is attacked by water containing carbonate and thereby extensively transformed to magnesium carbonate; it should, therefore, only be used in the silica removal treatment of water free or freed of carbonates; and in regeneration, milder acids, such as acetic acid, should be employed.

I am aware of the use of marble, dolomite, magnesia, caustic magnesite and sintered magnesite suggested for deacidification of water, especially removal of carbon dioxide. In a water de-acidification process the free $CO_2$ in the water reacts with the dolomite or magnesite to dissolve it as bicarbonate or carbonate. In addition, substantial quantities of magnesium compound are dissolved in the form of hydroxide making the water more or less alkaline, according to the magnesium hydroxide concentration. Such processes of de-acidification, however, differ fundamentally from silica removal in accordance with my invention in that the treatment medium may be used indefinitely without requiring regeneration, and is, in fact, not regenerated. Any incidental reduction of the silica content of the water being de-acidified which may take place while the acid removal medium is fresh, soon comes to an end.

For silica removal by means of burned magnesite in accordance with my invention it is advantageous to preheat the water since at elevated temperatures silica removal takes place more rapidly and, as a rule, more thoroughly.

The grain size of burned magnesite best suited for silica removal varies somewhat. In general, grains of about 0.2 to 0.5 mm. diameter have given good results.

Regeneration of the magnesite is carried out when its silica removal capacity has been exhausted to such extent, that the silica content of the treated water has reached the maximum limit considered allowable for the purpose for which the water is to be used. The regeneration is best carried out with dilute acid in order to avoid attack on the magnesite grains proper. The use of dilute hydrochloric acid has been found to give good results in regeneration, but other mineral acids, such as nitric, sulfuric, or carbonic acid, as well as organic acids, such as acetic or lactic acid are likewise suitable.

One good way of carrying out the regeneration is to pass the acid upwardly through the bed of exhausted burned magnesite, since this facilitates the escape of gases, such as $CO_2$, which, as a rule, are liberated during regeneration. If desired, the material may be removed from the container in which the silica removal treatment takes place, for regeneration elsewhere.

The amount of acid required for regeneration is usually quite small. When the acid is passed through exhausted magnesite the regenerating reactions neutralize the acid completely and the effluent is alkaline. In order to restore to the burned magnesite its full silica removal capacity it is, of course, necessary to regenerate it completely, and an indication that this has been accomplished is available in the appearance of acid in the effluent. The exact quantity of acid to be used for regeneration is thus readily determined in each case by continuing the flow of acid until traces of acid begin to appear in the waste effluent. As stated above, during regeneration gases are usually liberated, and it is clear, therefore, that the regeneration process has not been carried to completion as long as gases escape from the magnesite undergoing regeneration. Thus, another criterion for determining the minimum quantity of acid required for complete regeneration is found in the fact that there should be no liberation of gases from the bed at the end of the acid treatment.

The acid is best used in quite dilute form, a concentration of ½ to 2 per cent giving good results. The rate at which the acid is passed through the magnesite should be such that the total time of contact between acid and magnesite is of the order of about 10 minutes to one hour.

Prior to regeneration it is advisable to loosen the magnesite bed by means well known to accomplish this, such as backwashing, surface washing, or by mechanical means as, for instance, rakes moved through the bed. When the regeneration is carried out by flowing dilute acid upwardly through the bed such loosening operation prior to regeneration may be dispensed with, especially if the water being treated is relatively clear, because the upflowing acid then performs a backwashing function. In cases where a water with high turbidity, especially one with relatively low silica content, is treated for silica removal it may be necessary to carry out one or even several bed loosening operations between normal regenerations since the silica removal capacity of burned magnesite is high, and the treatment runs, therefore, relatively long.

After completion of the acid treatment the magnesite is freed of any remaining free acid by rinsing it with water, the effluent being discharged to waste until it is entirely free of acid and shows a sufficiently low silica content, whereupon the magnesite may again be used for further silica removal.

In using burned magnesite for silica removal with subsequent regeneration some magnesite is consumed. In order to make up for this loss it is necessary to replenish the burned magnesite at infrequent intervals. As far as I have been able to ascertain, the magnesite consumption appears to be approximately equal to the magnesium bound to silica in the form of magnesium silicate, plus an amount consumed in neutralizing $CO_2$, as well as other side reactions, evidenced by a reduction of the alkalinity, if any, of the water being treated for silica removal. It follows, therefore, that in cases where a water with appreciable alkalinity is to be treated the magnesite loss can be reduced by pre-treating the water so as to reduce or completely remove its alkalinity by any one of the methods well known for this purpose. In this connection, good ways of reducing the alkalinity are softening by precipitation, or by a combination of hydrogen and sodium base exchange, or neutralizing alkalinity by the addition of acid or acid salt, such as sulfuric acid or sodium bisulfate.

My process may be combined with other silica removal processes. Thus, water may be partially freed of its silica by other methods, as for instance the gel methods referred to above, and then passed through a bed of burned magnesite in order to substantially remove all remaining silica. Or, the water may be pre-treated by feeding to it silica precipitating or binding agents, as for instance the hydroxides of metals such as iron and aluminum, or by forming such agents in the water prior to its passage through a bed of burned magnesite; the magnesite bed, in addition to removing the remaining silica as described, then acts as a filter and collects the precipitated matter which is periodically removed from the bed by backwashing.

Other examples of pre-treating the water before silica removal by means of burned magnesite are the addition of caustic magnesium compounds, such as $MgO$ or $Mg(OH)_2$, in the form of milk of magnesia; or else the water may first be passed through a magnesite filter which mainly serves the purpose of neutralizing the water.

The thoroughness of removing silica from water by my new process, and the relatively small amount of acid required for regeneration of the magnesite are illustrated in the following example:

10.6 cubic feet of burned magnesite having a grain size of 0.2 to 0.5 mm. diameter was used in a bed 50 inches deep to remove silica from a water which had an initial silica content of 12 to 15 parts per million and a total hardness of 179 to 215 parts per million, of which two-thirds was carbonate and one-third non-carbonate hardness. The water was preheated to a temperature of 176 to 189° F. and then passed through the bed of the burned magnesite at a flow rate of about 1060 to 1320 gallons per hour. The silica was removed so thoroughly that even at the end of the test, after treating about 24,000 gallons, the silica content of the treated water did not exceed one part per million. The burned magnesite had first been regenerated with 240 gallons of hydrochloric acid solution made from commercial hydrochloric acid and containing 37.4 pounds of HCl. The progress of the run is shown in the following table:

| Gallons of water treated | $SiO_2$ content of treated water in parts per million | Alkalinity of treated water in parts per million | | |
|---|---|---|---|---|
| | | Phenol-phthalein | Methyl orange | Total |
| 5,000 | 0.5 | 2.5 | 8.0 | 10.5 |
| 8,500 | 0.5 | 2.5 | 8.5 | 11.0 |
| 10,100 | 0.5 | 2.5 | 8.0 | 10.5 |
| 13,700 | 0.5 | 2.3 | 8.2 | 10.5 |
| 16,400 | 0.7 | 2.3 | 8.2 | 10.5 |
| 18,800 | 0.7 | 2.5 | 8.2 | 10.7 |
| 21,400 | 0.8 | 2.5 | 8.0 | 10.5 |
| 22,700 | 0.8 | 2.5 | 8.2 | 10.7 |

Since the untreated water had a total alkalinity of 15 to 16 parts per million the test results show that an alkalinity reduction of about one-third of the carbonate content took place hand in hand with the silica removal. The hardness of the treated water was about 144 parts per million and this was practically all magnesium hardness.

The burned magnesite which was used in this test had the following composition:

| | Per cent |
|---|---|
| Insoluble in hydrochloric acid (silicates) | 5.5 |
| $Fe_2O_3$ | 5.1 |
| $Al_2O_3$ | 1.5 |
| CaO | 3.7 |
| MgO | 84.0 |
| Ignition loss ($CO_2+H_2O$) | 0.2 |

The following table shows the results of a test run under similar conditions as the one described above, except that the water was cold and not preheated.

| Gallons of water treated | $SiO_2$ content of treated water in parts per million | Alkalinity of treated water in parts per million | | | Flow rate in gallons per hour |
|---|---|---|---|---|---|
| | | Phenol-phthalein | Methyl orange | Total | |
| 16,600 | 0.15 | 8.7 | 9.0 | 17.7 | 240 |
| 19,100 | 0.5 | 8.2 | 10.0 | 18.2 | 400 |
| 20,200 | 0.9 | 8.2 | 10.0 | 18.2 | 530 |
| 30,600 | 3.25 | 7.5 | 9.2 | 16.7 | 530 |
| 31,200 | 2.5 | 7.0 | 9.0 | 16.0 | 320 |
| 32,200 | 1.25 | 7.0 | 8.7 | 15.7 | 240 |
| 32,800 | 1.25 | 7.2 | 9.0 | 16.2 | 240 |

The $SiO_2$ content of the treated water as well as the silica removal capacity of the burned magnesite are quite similar to those obtained in the hot water test, but phenol-phthalein and total alkalinities are somewhat higher. The last column of this table shows how the rate of flow was varied during the test. The results lead to the conclusion that in the case of cold water the rate of flow should not exceed 240 to 400 gallons per hour for a bed of 10.6 cubic feet, which is about one-third to one-fifth of the rate used with good results in the previously described hot water test.

In making silica removal tests at ordinary temperatures I found that directly after regeneration of the burned magnesite the treated water has a high $SiO_2$ content, occasionally even higher than that of the untreated water; only after some time does the silica content of the treated water drop to the desired low value. This appears to be due to the fact that after regeneration the silicates are present in a colloidal state. While this presence of larger amounts of silica in the treated water directly after regeneration is less pronounced when the silica content of the burned magnesite is low (1 to 2 per cent) than when it is higher (5.5%) so that the use of magnesite containing no or but little silica is desirable for that reason, this difficulty of a higher silica content in the treated water at the beginning of a run may be overcome by coagulation of the silica or silicates. Such coagulation treatment associated with the process of regenerating the burned magnesite may take one of several forms.

One way of overcoming this difficulty is to allow the burned magnesite to stand at rest for some time after regeneration. I found that a bed of burned magnesite regenerated in the evening and standing idle overnight gave on the following morning an effluent with a satisfactorily low silica content. This suggests a method of operation including a period of idleness following regeneration of the magnesite. This can usually be provided because when a plant does not require a continuous supply of water treated for silica removal the addition of a rest period to the time out for regeneration is as a rule of little consequence. Where such longer interruption of the supply of water is not permissible, or where a continuous supply of water is needed it is necessary either to provide a storage of water freed of its silica content, or else to install two silica removal units one of which serves to treat the water while the other is regenerated and then allowed to stand idle until the silica removal capacity of the first unit has been exhausted.

There are other ways of coagulating the silica or silicates and place the burned magnesite within a relatively short time in such condition that it produces a treated water with low silica content. Upon regeneration and rinsing the magnesite may be brought in contact with the solution of a salt which coagulates the silicates and thus does away with the colloidal state. For this purpose solutions of the salts of univalent and bivalent bases have been found useful, e. g., sodium chloride or magnesium sulfate solutions in concentrations of about 5 to 10 per cent. These are neutral salt solutions. The best effect, however, has been obtained by the use of salts which, upon hydrolysis, have an acid reaction and which, consequently, are decomposed by the magnesite. Examples of such salts are those of tri-valent bases, especially aluminum and iron. The solutions of such salts can be used in much more dilute form than those of the neutral salts, concentrations of one and even of one-half percent producing the desired effect. The quantity of salt required is likewise appreciably smaller than in the case of neutral salts, 0.6 pound of aluminum sulfate, for instance, being sufficient for the treatment of one cubic foot of burned magnesite. In the use of these salts coagulation apparently is effected not only by the electrolyte but also by the metal hydrates formed upon contact with the magnesite. While salts of other tri-valent metals, such as chromium salts, may be above mentioned salts of aluminum and best suited for practical purposes, not ause of their low cost, but also because of cellent effect. Even the salts of metals other valencies may be employed, for in- alts of zinc, tin or copper. In the use reacting salts the quantity of salt may be rger to such extent that a preceding sepa- atment with acid becomes unnecessary rbonates, etc., are decomposed on account cid reaction. The formed hydrates are ninated by rinsing.

, furthermore, found that coagulation of tes may be brought about by application The simplest way of doing this is to water, preferably at boiling temperature, the bed so that the burned magnesite i by the water. In general, a quantity equal to 2.5 to 4 volumes of the burned e is sufficient, but more water, e. g., 8 may well be used. The beneficial ef- ie hot water is further improved by dis- n it electrolytes such as those referred preceding paragraph, but in most cases if plain hot water is sufficient for prac- poses. Another way of applying heat is se of a heating jacket which is placed he container for burned magnesite and which hot water or steam is passed. The r employed for the coagulation treat- ally has such low silica content that it sed without harm.

other way of effecting the desired coag- to treat the burned magnesite with as in the form of a watery solution. generation, rinsing and subsequent co- by heat or the addition of coagulants an be carried out in a relatively short entire treatment requiring in general o one and one-half hours. As com- a allowing the magnesite to stand idle, od of treatment has the advantage that a shorter interruption in the silica re- formance. Even with these quick act- ation measures, however, a short period of, say, one hour has been found bene- iat the entire treatment, including the l, then requires from two to two and ours.

ve mentioned methods of coagulating or silicates can, at least partly, replace neration. Thus, burned magnesite ordinary temperatures no longer pro- ated water with sufficiently low silica ay be treated for a brief period with and then will again produce low silica r example, a bed of burned magnesite .09 cubic foot was used to treat cold a silica content of 14 parts per mil- l exhaustion of this bed to such an the treated water contained as much per million of silica, a simple treat- 2.65 gallons of hot water made it pos- in an additional 100 to 130 gallons of y silica free water, provided that after withdrawing 15 to 20 gallons of ter the magnesite bed was allowed e for several hours or the hot water vas repeated. When the hot water lo longer restores the silica removal the burned magnesite an acid regen- arried out. Thus, a plurality of hot ments may alternate with one acid t treatment, the magnesite being ca removal between such treatments.

Even burned magnesite which has become exhausted in the silica removal treatment of hot water may be restored to a satisfactory condition for some further use by one of the above mentioned coagulation measures, other than the application of heat, or by treatment with water at a higher temperature than that of the hot water being treated for silica removal.

As has already been pointed out, several of the coagulation measures may be combined. A period of idleness following regeneration is always beneficial, even when heat or coagulants or both have been applied in connection with the regeneration process.

Prolonged tests in which burned magnesite was alternately exhausted and regenerated have shown that repeated regeneration of the magnesite increases its silica removal capacity between regenerations. The fact may be utilized for initially increasing the capacity of burned magnesite prior to using it for silica removal, by bringing it in contact with acid, thus etching or activating the grains. For a greater increase in capacity this acid pre-treatment is repeated a number of times with fresh acid or with a mixture of fresh and used acid.

Another way of activating the burned magnesite is to bring it into prolonged contact, e. g., for one-half to two hours, with hot water, preferably at boiling temperature, or steam. The hot water or steam may be repeatedly circulated through the container holding the burned magnesite undergoing activation, but it is better to renew the hot water or steam continuously or at least repeatedly in order to bring the magnesite again in contact with fresh activating medium. Good activation is obtained by combining the hot water or steam treatment with a treatment with acid, e. g., hydrochloric or acetic acid, or $CO_2$ containing water. The two treatments may be combined through the use of dilute hot acid, but it is somewhat better to carry out the two steps separately, either one following the other. Still better activation is obtained by alternately repeating the treatments with hot water or steam and with acid two or three or more times.

The duration and intensity of the activating treatment to be used for best results, e. g., temperature, acid concentration and number of repetitions, depend somewhat upon the type of raw material employed in making the burned magnesite, and the burning temperature, magnesite burned at very high temperatures apparently requiring a stronger activation than one burned at a lower temperature.

Details of carrying out a good activation treatment and the improvements in the results obtained thereby are illustrated by the following example. A burned magnesite of a grain size of 0.2 to 0.6 mm. was used which had been prepared by burning Austrian magnesite at a temperature of about 3180° F. The activating medium was a solution of 37.4 pounds hydrochloric acid in 240 gallons of water. This solution was heated to about 194° F. and then repeatedly passed through 10.6 cubic feet of the magnesite for a period of 30 minutes. This treatment was repeated three more times with fresh treating solution so that the entire treatment required about two hours. Thereupon the activated magnesite had 2.7 times the silica removal capacity of the same, not activated magnesite, and it could be used to treat correspondingly larger quantities of water for silica removal between regenerations.

What I claim is:

1. A process of removing silica from water which comprises bringing the water in contact with burned magnesite, removing the water from contact with said magnesite, then treating said magnesite with dilute acid reacting solution of at least one of the group of compounds consisting of hydrochloric, sulphuric, carbonic, nitric, acetic and lactic acids and those salts of iron, aluminum and chromium which hydrolize in solution to give an acid reaction, and then bringing an additional quantity of water in contact with said magnesite.

2. A process of removing silica from water which comprises reducing the alkalinity of water, then passing said water through a bed of granular burned magnesite to a point of use until the water flowing from said bed contains appreciable silica, treating said bed with a dilute solution of an acid from the group consisting of hydrochloric, sulfuric, carbonic, nitric, acetic and lactic acids, rinsing said bed, and again passing said water through said bed.

3. A process of removing silica from water which comprises passing water through a bed of granular burned magnesite to a point of use until the water flowing from said bed contains appreciable silica, then flowing through said bed dilute acid reacting solution of at least one of the group of compounds consisting of hydrochloric, sulfuric, nitric, carbonic, acetic and lactic acids and those salts of iron, aluminum and chromium which hydrolize in solution to give an acid reaction, until the liquid flowing from the bed contains acid, rinsing the bed free of acid, and again passing water through said bed.

4. A process of removing silica from water which comprises passing water downwardly through a bed of granular burned magnesite to a point of use until the water flowing from said bed contains appreciable silica, then passing upwardly through said bed to waste a dilute acid reacting solution of at least one of the group of compounds consisting of hydrochloric, sulfuric, nitric, carbonic, acetic and lactic acids and those salts of iron, aluminum and chromium which hydrolize in solution to give an acid reaction, passing water downwardly through said bed to waste until the water flowing to waste has a low silica content, and then again passing water downwardly through said bed to said point of use.

5. A process of removing silica from water which comprises passing water through a bed of granular burned magnesite until the water flowing from said bed contains appreciable silica, then flowing through said bed dilute acid reacting solution of at least one of the group of compounds consisting of hydrochloric, sulfuric, nitric, carbonic, acetic and lactic acids and those salts of iron, aluminum and chromium which hydrolize in solution to give an acid reaction, rinsing said bed free of acid, allowing said bed to stand idle for a prolonged period without flow therethrough, and again passing water through said bed.

6. A process of removing silica from water which comprises bringing the water in contact with burned magnesite, removing the water from contact with said magnesite, then treating said magnesite with a dilute acid reacting solution of at least one of the group of compounds consisting of hydrochloric, sulfuric, nitric, carbonic, acetic and lactic acids and those salts of iron, aluminum and chromium which hydrolize in solution to give an acid reaction, then treating said magnesite with $H_2O$ at a temperature higher than that of said water, and then bringing an additional quantity of water in contact with said magnesite.

7. A process of removing silica from cold water which comprises passing cold water through a bed of granular burned magnesite, thereafter treating said magnesite with a dilute solution of acid from the group consisting of hydrochloric, sulfuric, nitric, carbonic, acetic and lactic acids, thereafter passing hot water through said magnesite, and again passing cold water through said magnesite.

8. A process of removing silica from cold water which comprises passing cold water through a bed of granular burned magnesite to a point of use until the cold water flowing from said bed contains appreciable silica, then passing hot water through said magnesite, then again passing cold water through said magnesite, then treating said magnesite with a dilute acid reacting solution of at least one of the group of compounds consisting of hydrochloric, sulfuric, nitric, carbonic, acetic and lactic acids and those salts of iron, aluminum and chromium which hydrolize in solution to give an acid reaction, then treating said magnesite with $H_2O$ at a temperature higher than that of said water, and again passing cold water through said magnesite to a point of use.

9. A process of removing silica from water which comprises activating burned magnesite by a treatment with hot $H_2O$, bringing the water in contact with said activated magnesite, removing the water from contact with said magnesite, then treating said magnesite with a dilute acid reacting solution of at least one of the group of compounds consisting of hydrochloric, sulfuric, carbonic, nitric, acetic and lactic acids and those salts of iron, aluminum and chromium which hydrolize in solution to give an acid reaction, and then bringing an additional quantity of water in contact with said magnesite.

10. A process of removing silica from water which comprises activating burned magnesite by treating it with a dilute solution of acid from the group consisting of hydrochloric, sulfuric, nitric, carbonic, acetic and lactic acids, bringing the water in contact with said activated magnesite, removing the water from contact with said magnesite, then treating said magnesite with a dilute acid reacting solution of at least one of the group of compounds consisting of hydrochloric, sulfuric, carbonic, nitric, acetic and lactic acids and those salts of iron, aluminum and chromium which hydrolize in solution to give an acid reaction, and then bringing an additional quantity of water in contact with said magnesite.

11. The process of claim 10, the dilute solution of acid being hot.

12. A process of removing silica from water which comprises passing the water through a bed of granular burned magnesite to a point of use until the water flowing from said bed contains appreciable silica, thereafter treating said magnesite with dilute acid reacting solution of at least one of the group of compounds consisting of hydrochloric, sulfuric, nitric, carbonic, acetic and lactic acids and those salts of iron, aluminum and chromium which hydrolize in solution to give an acid reaction, thereafter treating said magnesite with a solution of silica coagulant from the group consisting of sodium chloride and magnesium sulfate, and again passing water through said magnesite to a point of use.

13. A process of removing silica from water which comprises passing the water through a bed of granular burned magnesite to a point of use until the water flowing from said bed contains appreciable silica, thereafter treating said magnesite with dilute acid reacting solution of at least one of the group of compounds consisting of hydrochloric, sulfuric, nitric, carbonic, acetic and lactic acids and those salts of iron, aluminum and chromium which hydrolize in solution to give an acid reaction, thereafter treating said magnesite with a solution of ammonia to coagulate dissolved silica, and again passing water through said magnesite to a point of use.

OTTO LIEBKNECHT.